United States Patent
Yabuki (10) Patent No.: US 8,335,001 B2
(45) Date of Patent: Dec. 18, 2012

(54) PERIPHERAL DEVICE AND NETWORK SYSTEM

(75) Inventor: Tomoyasu Yabuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 809 days.

(21) Appl. No.: 12/406,872

(22) Filed: Mar. 18, 2009

(65) Prior Publication Data

US 2009/0237729 A1    Sep. 24, 2009

(30) Foreign Application Priority Data

Mar. 21, 2008 (JP) ................. 2008-074239

(51) Int. Cl.
*G06F 3/12* (2006.01)
(52) U.S. Cl. .............. 358/1.15; 358/1.16; 358/1.14; 709/224; 714/24; 711/115
(58) Field of Classification Search .......... 358/1, 15, 358/1.14, 1.16, 17, 3.04; 709/224; 714/24, 714/23, 49, 51; 711/115
See application file for complete search history.

(56) References Cited

U.S. PATENT DOCUMENTS

| | | | | |
|---|---|---|---|---|
| 5,699,546 A * | 12/1997 | Nishikata et al. | ............. | 711/103 |
| 5,875,449 A * | 2/1999 | Ono | ............. | 711/100 |
| 6,002,845 A * | 12/1999 | Honma | ............. | 358/1.16 |
| 6,052,200 A * | 4/2000 | Mitani | ............. | 358/1.16 |
| 7,039,811 B2 * | 5/2006 | Ito | ............. | 713/185 |
| 7,169,281 B2 * | 1/2007 | Juda et al. | ............. | 204/630 |
| 7,170,646 B2 * | 1/2007 | Baba | ............. | 358/442 |
| 7,215,668 B2 * | 5/2007 | Saito | ............. | 370/392 |
| 7,403,696 B2 * | 7/2008 | Suga et al. | ............. | 386/239 |
| 7,533,949 B2 * | 5/2009 | Inoue et al. | ............. | 347/5 |
| 7,570,377 B2 * | 8/2009 | Fukuhara | ............. | 358/1.14 |
| 7,586,633 B2 * | 9/2009 | Urabe | ............. | 358/1.15 |
| 7,631,177 B2 * | 12/2009 | Aizawa | ............. | 713/1 |
| 7,796,303 B2 * | 9/2010 | Kakutani | ............. | 358/3.13 |
| 7,805,569 B2 * | 9/2010 | Endo | ............. | 711/115 |

(Continued)

FOREIGN PATENT DOCUMENTS

JP    H11-177598 A    7/1999

(Continued)

OTHER PUBLICATIONS

Japan Patent Office, Notice of Reasons for Rejection for Japanese Patent Application No. 2008-074239, mailed Jun. 1, 2010.

*Primary Examiner* — Negussie Worku
(74) *Attorney, Agent, or Firm* — Baker Botts L.L.P.

(57) ABSTRACT

A peripheral device includes a connection portion which is connectable to an information processing device and a storage medium. The connection portion is configured to allow data transfer between the storage medium and the information processing device. The peripheral device further includes a function execution portion that performs a function according to data transferred from the information processing device. The peripheral device still further includes a detection portion that detects a state of the data transfer between the function execution portion and the information processing device. Moreover, the peripheral device includes a notification portion that notifies the information processing device that the storage medium is not connected to the connection portion, irrespective of whether the connection state of the storage medium to the connection portion is connected or not, when the detection portion detects a start of the data transfer between the function execution portion and the information processing device.

9 Claims, 12 Drawing Sheets

U.S. PATENT DOCUMENTS

| | | | |
|---|---|---|---|
| 7,813,362 B2 * | 10/2010 | Ikeda et al. | 370/412 |
| 7,818,579 B2 * | 10/2010 | Nishiguchi et al. | 713/181 |
| 7,818,589 B2 * | 10/2010 | Watanabe | 713/300 |
| 8,028,111 B2 * | 9/2011 | Takahashi | 710/106 |
| 8,028,244 B2 * | 9/2011 | Takahashi et al. | 715/772 |
| 8,176,261 B2 * | 5/2012 | Sugizaki | 711/143 |
| 8,233,937 B2 * | 7/2012 | Ueda et al. | 455/552.1 |
| 2002/0140952 A1 * | 10/2002 | Fukasawa | 358/1.6 |
| 2004/0196484 A1 | 10/2004 | Masumoto et al. | |
| 2005/0023339 A1 | 2/2005 | Uno | |
| 2008/0204804 A1 * | 8/2008 | Yamada | 358/1.15 |

FOREIGN PATENT DOCUMENTS

| | | |
|---|---|---|
| JP | 2003-127472 A | 5/2003 |
| JP | 2003-161591 A | 6/2003 |
| JP | 2005-018645 A | 1/2005 |
| JP | 2005-115748 A | 4/2005 |
| JP | 2005-161591 A | 6/2005 |
| JP | 2005-246685 A | 9/2005 |
| JP | 2007-185791 A | 7/2007 |
| JP | 2008-060937 A | 3/2008 |

* cited by examiner

Fig.13 MFP DEVICE TURNED ON: USB CONNECTED WITH ONE MEDIUM INSERTED

STORAGE MEDIA ↓ USB POWER OFF

MFP DEVICE TURNED OFF: USB DISCONNECTED

↓ USB POWER ON

MFP DEVICE TURNED ON: USB CONNECTED WITH TWO MEDIA INSERTED

PERIPHERAL DEVICE AND NETWORK SYSTEM

CROSS REFERENCE TO RELATED APPLICATION

This application claims priority to and the benefit of Japanese Patent Application No. 2008-074239, filed Mar. 21, 2008, the entire subject matter and disclosure of which is incorporated herein by reference.

BACKGROUND

1. Technical Field

The present invention relates to a peripheral device and a system for grasping and managing an access state of a storage medium.

2. Related Art

In recent years, peripheral devices incorporating various devices such as a digital camera, cellular phone and scanner, and various storage media for storing image data taken or captured by the above devices such as a flash memory card and universal serial bus (herein after referred to as USB) memory have been developed. The peripheral device may read out image data from a storage medium or the like and print the image, or store scanned image data in a storage medium or the like. Some peripheral devices are connectable to a personal computer (hereinafter referred to as PC). When a peripheral device is connected to a PC, a storage medium or the like mounted in the peripheral device may be recognized as a removable disk. By accessing the storage medium from the PC, image data may be written onto the storage medium, or image data stored in the storage medium may be read out.

It is known that, when a printer device performs printing on the basis of image data from a PC, the printer device allows the data from the PC to be directly output to a printer engine via a USB bus. This allows the PC to exchange data and signals directly with the printer engine to perform printing.

In a known photo-direct printer device image data from the PC is output to the printer engine via the USB bus to print the image data. The term USB refers to a type of serial bus for providing a connection between a PC and peripheral devices. Communication data is sent in packets, allowing a plurality of devices to be connected to one bus and simultaneously access each other in a timeshared method. In the known photo-direct printer device, the PC and the printer engine are connected in accordance with the normal USB bus standard.

Therefore, if access is performed between a PC and a storage medium while the PC is sending image data to a printer engine to perform printing, transmission of the image data to the printer engine and the access to the storage medium may be performed in a timeshared method. As a result, transfer speed of the image data to the printer engine may decrease. This may require more time to process the printing, and thus may delay completion of the printing.

Also due to the time-shared data transfer via the USB, scan data may be sent to the PC in a timeshared method, extension of image reading time of a peripheral device may be occurred.

SUMMARY

A need has arisen to provide a peripheral device or a system for controlling a recognition state of a storage medium connected to the peripheral device for an information processing device such as a PC during data processing between the peripheral device and the information processing device to ensure data processing speed.

According to an embodiment of the present invention, a peripheral device comprises a connection portion which is connectable to an information processing device and a storage medium. The connection portion is configured to allow data transfer between the storage medium and the information processing device. The peripheral device further comprises a function execution portion that performs data transfer with the information processing device and performs a function according to data transferred from the information processing device. The peripheral device still further comprises a detection portion that detects a state of the data transfer between the function execution portion and the information processing device. Moreover, the peripheral device comprises a notification portion that notifies the information processing device that the storage medium is not connected to the connection portion, irrespective of whether the connection state of the storage medium to the connection portion is connected or not, when the detection portion detects a start of the data transfer between the function execution portion and the information processing device.

According to an embodiment of the present invention, a network system comprises a peripheral device and an information processing device. The peripheral device includes a connection portion which is connectable to the information processing device and a storage medium. The connection portion is configured to allow data transfer between the storage medium and the information processing device. The peripheral device further includes a function execution portion that performs data transfer with the information processing device and performs a function according to data transferred from the information processing device. The peripheral device still further includes a detection portion that detects a state of the data transfer between the function execution portion and the information processing device. Moreover, the peripheral device includes a notification portion that notifies the information processing device that the storage medium is not connected to the connection portion, irrespective of whether the connection state of the storage medium to the connection portion is connected or not, when the detection portion detects a start of the data transfer between the function execution portion and the information processing device. The information processing device includes an assignment portion for assigning a drive to the connection portion according to the connection state of the storage medium to the connection portion notified by the notification portion. The information processing device further includes a display unit for displaying the drive assigned by the assignment portion

DETAILED DESCRIPTION OF THE PREFERRED EMBODIMENTS

Figure 1:
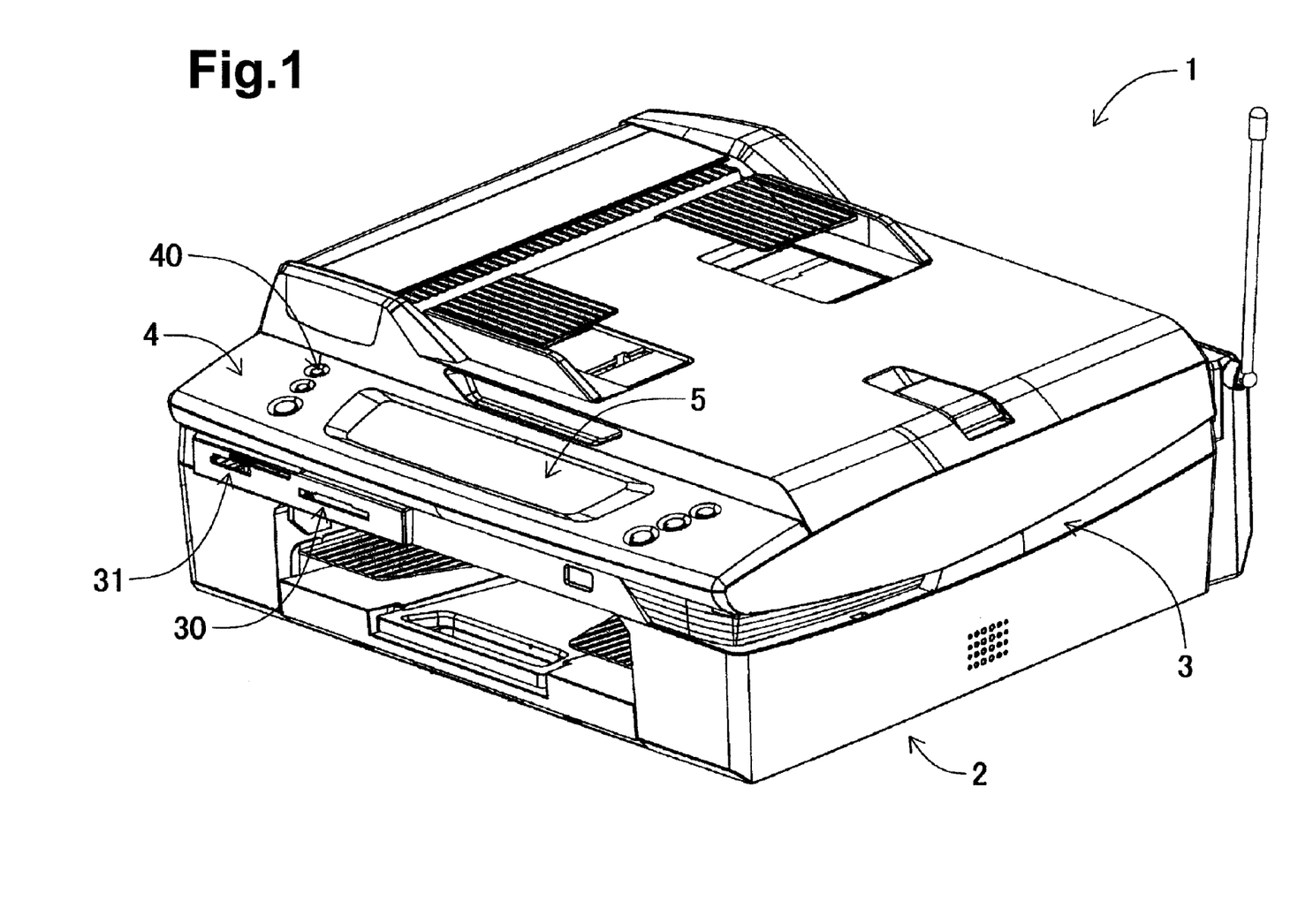
FIG. 1 is a schematic perspective view of a peripheral device according to an embodiment.
Figure 2:
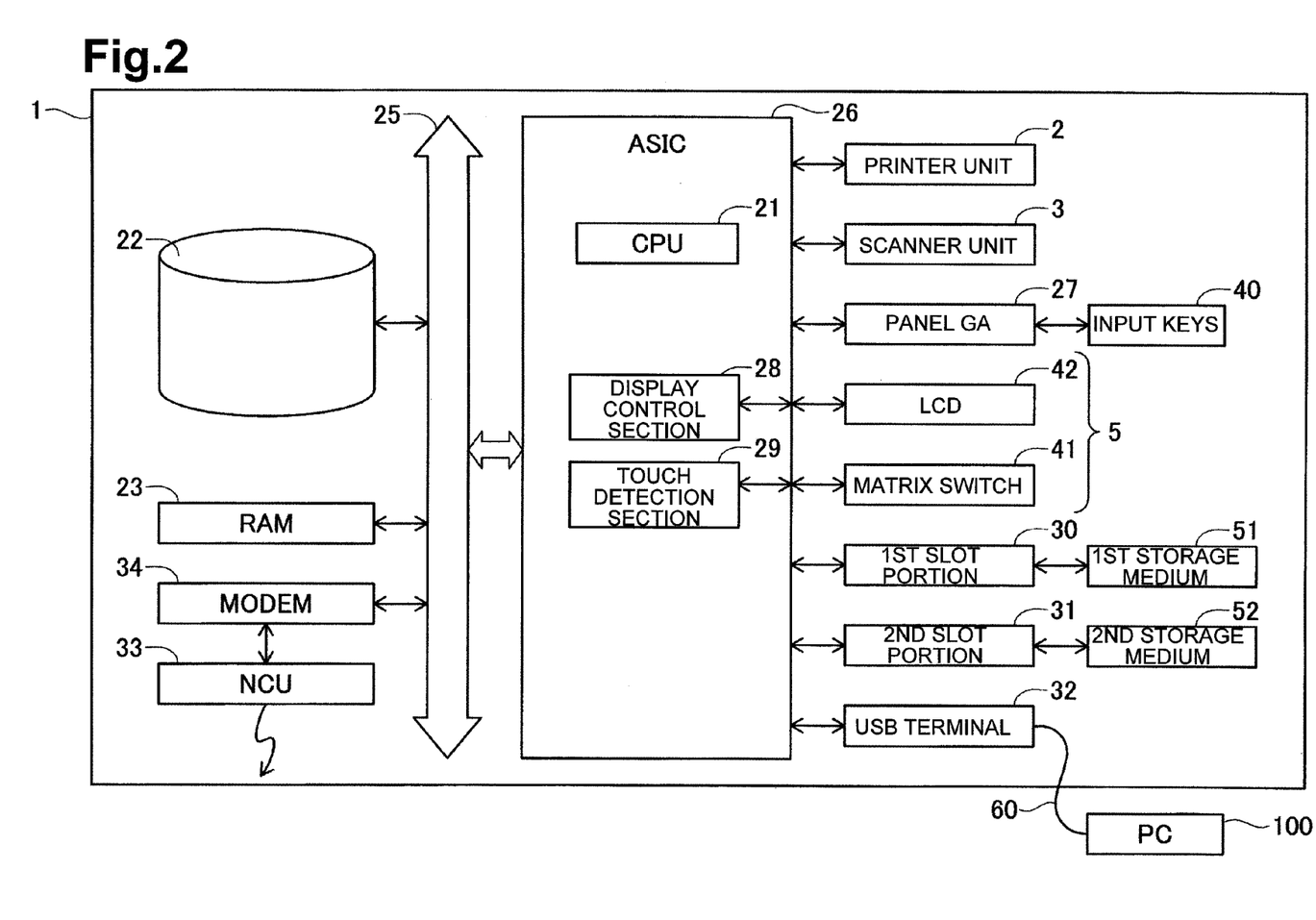
FIG. 2 is a circuit block diagram of the peripheral device.

FIG. 1 shows an example of an external configuration of a peripheral device 1. FIG. 2 shows an example of a system configuration of the peripheral device 1. The peripheral device 1 may include a printer unit 2 such as an ink-jet printer and a scanner unit 3 in a lower and upper portion of a frame respectively. The peripheral device 1 may also include an operation panel 4 on a front upper surface of the frame. A touch-panel 5 is disposed at a center of the operation panel 4. The touch-panel 5 includes a liquid crystal display (hereinafter referred to as LCD) 42 having a horizontally long rectangular display. The peripheral device 1 may include a facsimile (FAX) unit (not shown), either in place of or in addition to the scanner unit 3. A peripheral device may include the printer unit 2, the scanner unit 3, and the FAX unit, and may have various functions, such as a printer function for printing image data sent from a PC, a scanner function for sending scanned image data to a PC, a photocopier function and a FAX function, to be performed. Therefore, the peripheral device may be called a multifunction peripheral (MFP) device.

Input keys 40 include a power switch key for instructing to turn on the peripheral device 1. In response to operations of the input keys 40, various commands may be input to the peripheral device 1.

The peripheral device 1 includes a first slot portion 30 and a second slot portion 31 allowing data exchange with first and second removable storage media 51 and 52, respectively. The first and second storage media 51 and 52 are insertable into the first and second slot portions 30 and 31, respectively. Examples of the removable storage media may include a Compact Flash (registered trademark) and a Secure Digital (SD) Memory Card (registered trademark). The first and second slot portions 30 and 31 may be provided immediately below the operation panel 4. A Compact Flash (registered trademark) may be mountable in the first slot portion 30 as the first storage medium 51. An SD Memory Card (registered trademark) may be mountable in the second slot portion 31 as the second storage medium 52. The first slot portion 30 and the second slot portion 31 may be each provided with a sensor (not shown) for detecting the mounting/unmounting of the first and second storage media 51 and 52, respectively.

The system configuration of the peripheral device 1 will be described with reference to FIG. 2. FIG. 2 shows the system configuration of the peripheral device 1. An application specific integrated circuit (ASIC) 26 performs comprehensive control so as to execute the various functions of the peripheral device 1 in accordance with a command from a central processing unit (CPU) 21. The ASIC 26 is connected to an external storage device 22, a random-access memory (RAM) 23 and a modem 34 via an external bus 25. The printer unit 2 and the scanner unit 3 are connected to the ASIC 26. The input keys 40 are connected to the ASIC 26 via a panel gate array (panel GA) 27. The panel gate array (panel GA) 27 controls operations for inputting signals to the ASIC 26 in accordance with various operations of the input keys 40.

The touch-panel 5 is constituted by a matrix switch 41 including transparent electrodes, and a LCD 42 is disposed below the switch 41. The matrix switch 41 is connected to a touch detection section 29 in the ASIC 26. The LCD 42 is connected to a display control section 28 in the ASIC 26. When a user touches a desired point on the matrix switch 41, the touch detection section 29 detects the coordinates of the touched point and outputs a position signal to the CPU 21.

The display control section 28 controls display on a screen of the LCD 42 so as to display, on the LCD 42, various information about the function that the peripheral device 1 is executing in accordance with a command from the CPU 21.

A network control unit (NCU) 33 is connected to the modem 34 to control facsimile communication. The modem 34 is connected to the ASIC 26 via the external bus 25.

Figure 5:
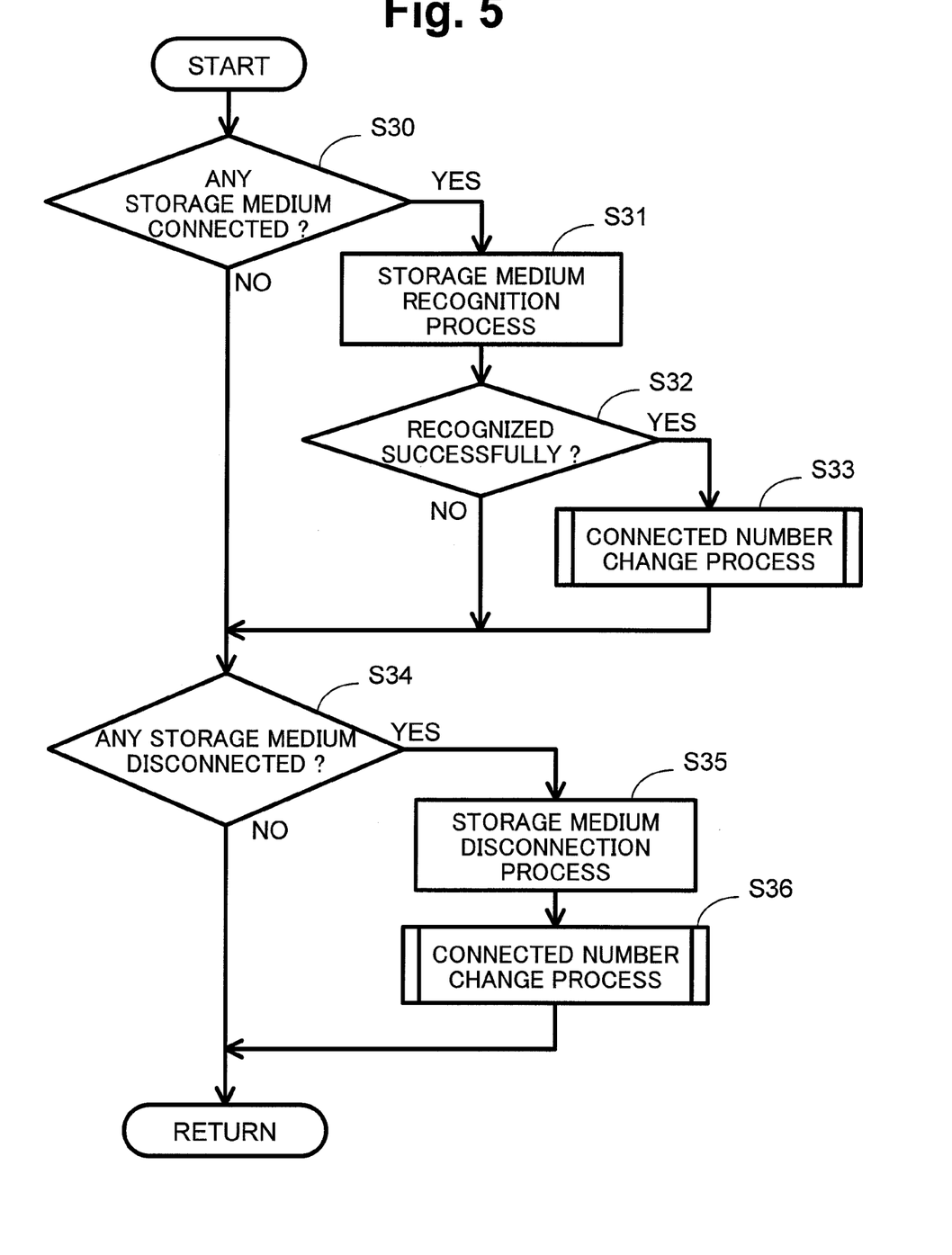
FIG. 5 is a flowchart showing a connection processing for connecting, a storage medium.
Figure 6:
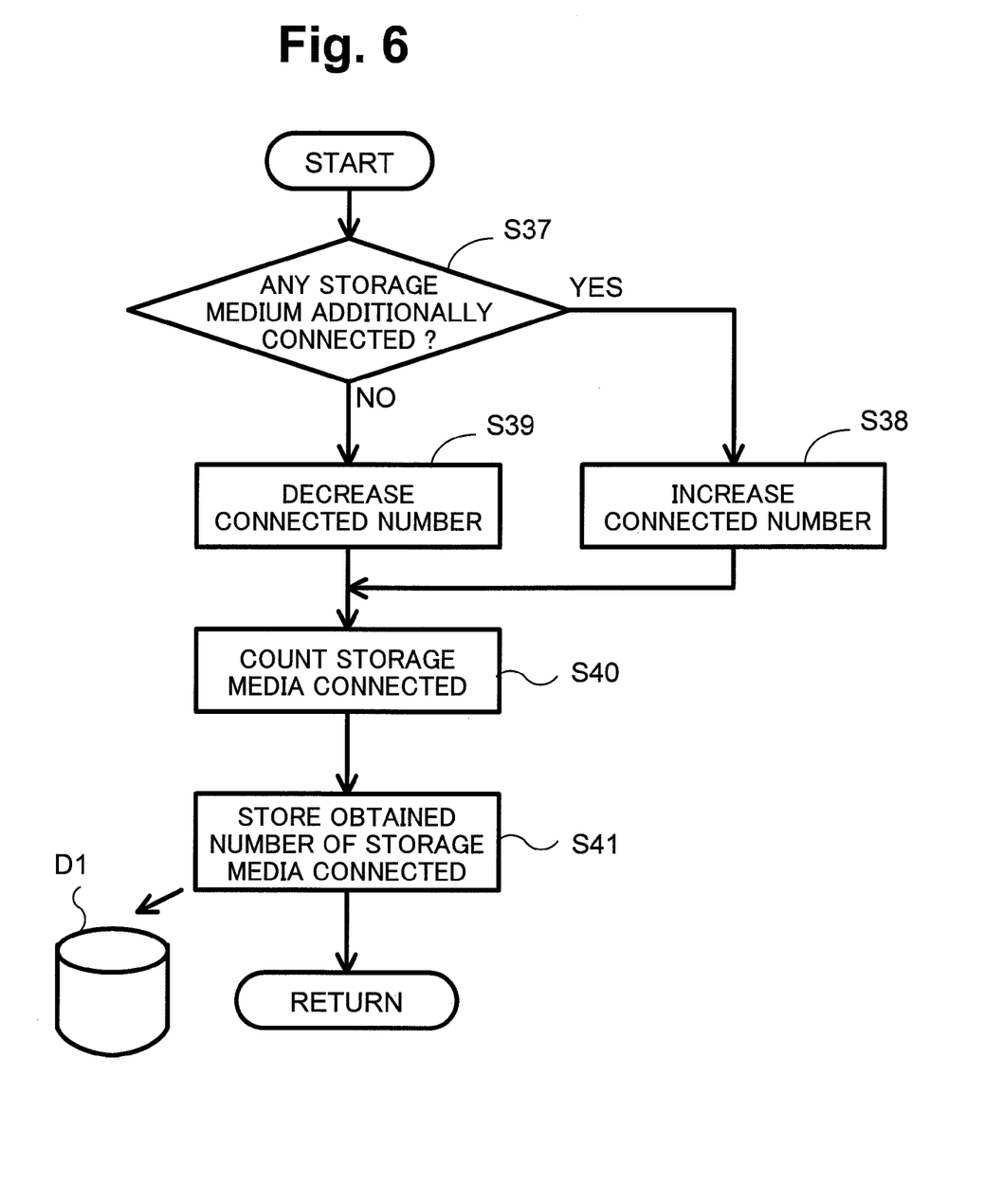
FIG. 6 is a flowchart showing a processing for changing a number of connected storage media.
Figure 7:
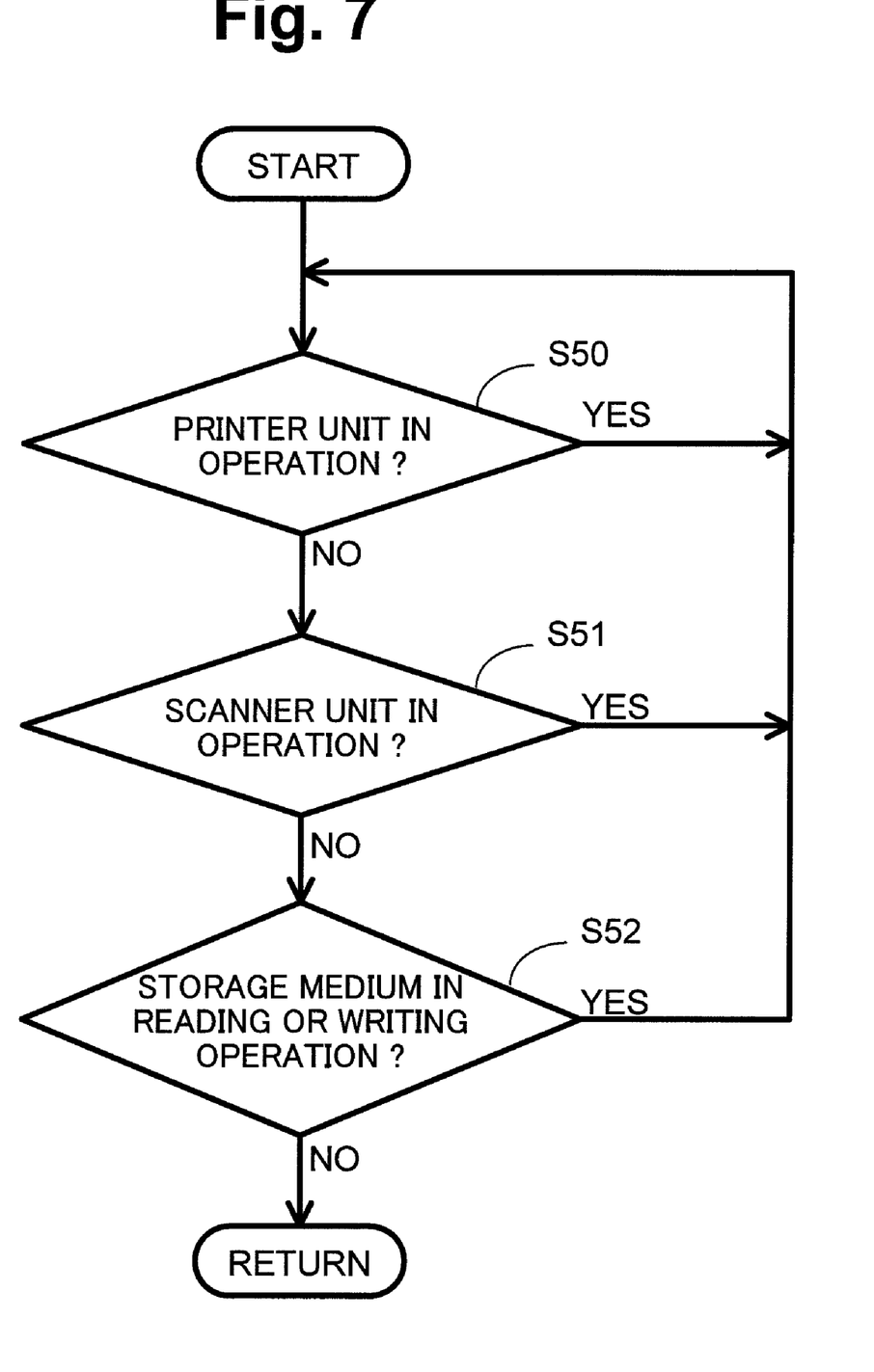
FIG. 7 is a flowchart showing a processing for checking whether or not a USB can be disconnected.

The external storage device 22 stores various execution programs to be read out and executed by the CPU 21, and various data. The various execution programs execute a power-on connection processing (shown in FIG. 3), a normal-operation connection processing (shown in FIG. 4), a storage-medium connection processing (shown in FIG. 5), a number-of-storage-media-connected change processing (shown in FIG. 6), a USB-disconnectability check processing (shown in FIG. 7), a USB-interface setting processing (shown in FIG. 8), and a USB connection processing (shown in FIG. 9). Examples of the data include number-of-storage-media-connected data (D1).

The power-on connection processing (shown in FIG. 3) and the normal-operation connection processing (shown in FIG. 4) are executed at the time of power-on and during normal operation, respectively, of the peripheral device 1. The processings inform a PC of information about the various functions of the peripheral device 1 such as the functions provided to the printer unit 2 and the scanner unit 3. The processings also inform the PC 100 of the number of storage media connected to the peripheral device 1. When the storage media 51 and/or 52 are mounted into or unmounted from the peripheral device 1, the storage-medium connection processing (shown in FIG. 5) recognizes the mounting/unmounting of the storage media 51 and/or 52 and changes the number of storage media connected. The number-of-storage-media-connected change processing (shown in FIG. 6) is a subroutine of the storage-medium connection processing (shown in FIG. 5), and counts any storage media connected and stores the obtained number in the external storage device 22 as the number-of-storage-media-connected data (D1). The USB-disconnectability check processing (shown in FIG. 7) detects whether or not data transfer is being performed with the PC 100 via a universal serial bus (USB). The USB-interface setting processing (shown in FIG. 8) registers the various functions provided by the peripheral device 1 and the number of storage media connected to the peripheral device 1. The USB connection processing (shown in FIG. 9) sends to the PC 100 information about the various functions of the peripheral device 1 and the registered number of storage media.

The RAM 23 is a work area in which the CPU 21 executes the various programs stored in the external storage device 22 and temporarily store the resulting calculation data.

The peripheral device 1 includes a USB terminal 32 connected to the PC 100 via a USB 60. The PC 100 transmits print data to the printer unit 2 and receives scan data from the scanner unit 3. In addition, the PC 100 may access the first and second storage media 51 and 52 connected to the peripheral device 1 so as to read out the data stored in the storage media and write data onto the storage media. The PC 100 and the storage media thus exchange data. The PC 100 and the peripheral device 1 are connected via the USB to constitute a network system. When the PC 100 is connected to the peripheral device 1 via the USB, the PC 100 requests information about the peripheral device. In response to the request from the PC 100, the peripheral device 1 sends to the PC 100 information about the connection state of storage media to the peripheral device 1.

Figure 3:
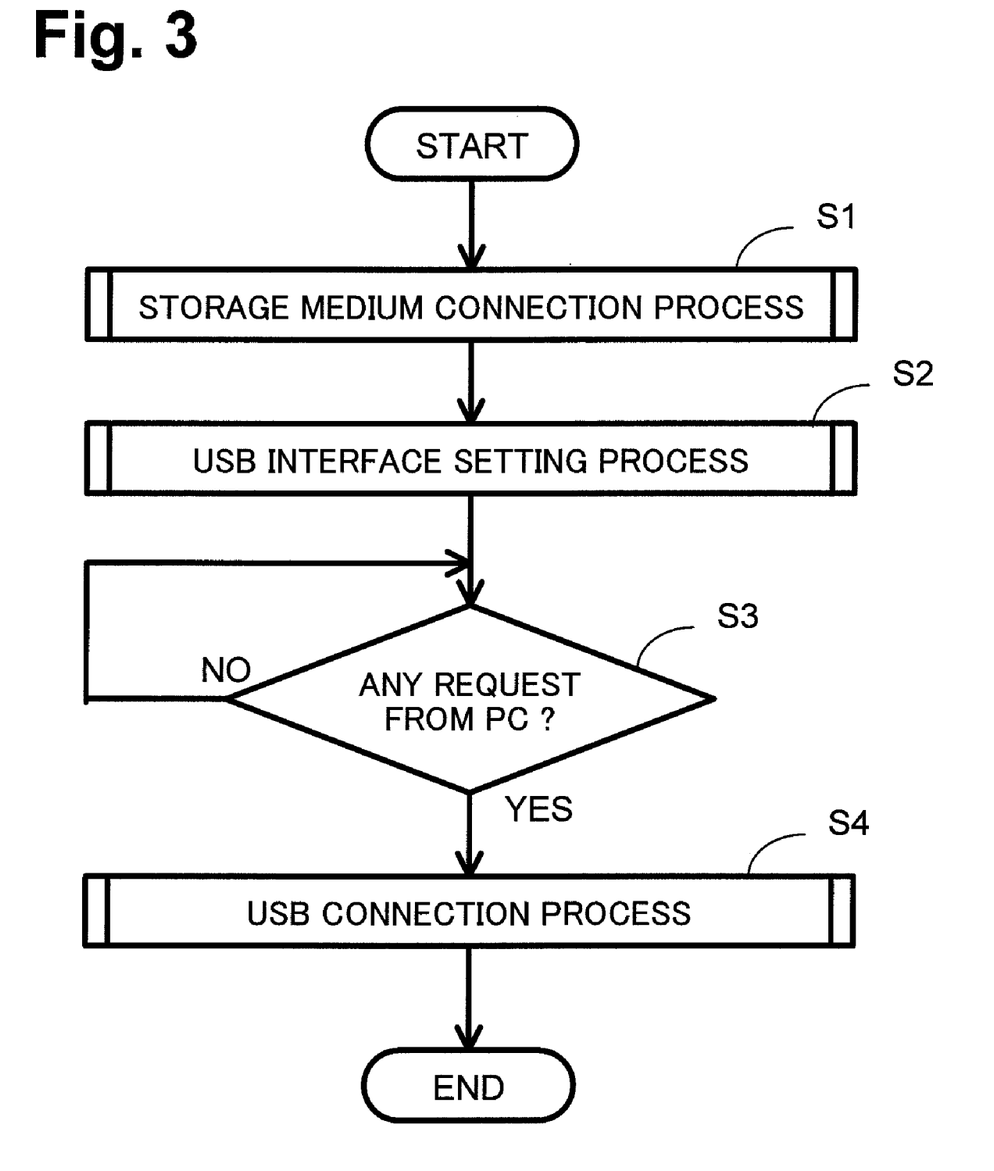
FIG. 3 is a flowchart showing a connection processing in a power-on state.

Hereinafter, the individual processings will be described in order. FIG. 3 shows a flowchart of the power-on connection processing. The processing is started by the CPU 21 in response to turning on the peripheral device 1. When the peripheral device 1 is turned on, the storage-medium connection processing (shown in FIG. 5) is executed. Each storage media connected to the peripheral device 1 is recognized and counted, and the obtained number is stored in the external storage device 22 as the number-of-storage-media-connected data (D1). Then, the USB-interface setting processing (shown in FIG. 8) is executed. The various functions provided by the peripheral device 1 and the number of storage media connected are registered (S2). Then, in response to the establishment of a USB connection with the PC 100, it is determined whether or not a request has been received from the PC 100 for information about the peripheral device (S3). If it is determined that no request for information have been received (S3: NO), the processing repeats the step of S3. On the other hand, if it is determined that a request for information has been received (S3: YES), the USB connection processing (shown in FIG. 9) is executed. Information about the various functions of the peripheral device 1 and the registered number of storage media is sent to the PC 100 (S4). The processes are performed when the peripheral device 1 is turned on to inform the PC 100 of the various functions of the peripheral device 1 and the connection state of storage media at the time of power-on. This allows initial setting of the network system constituted by the peripheral device 1 and the PC 100.

Figure 4:
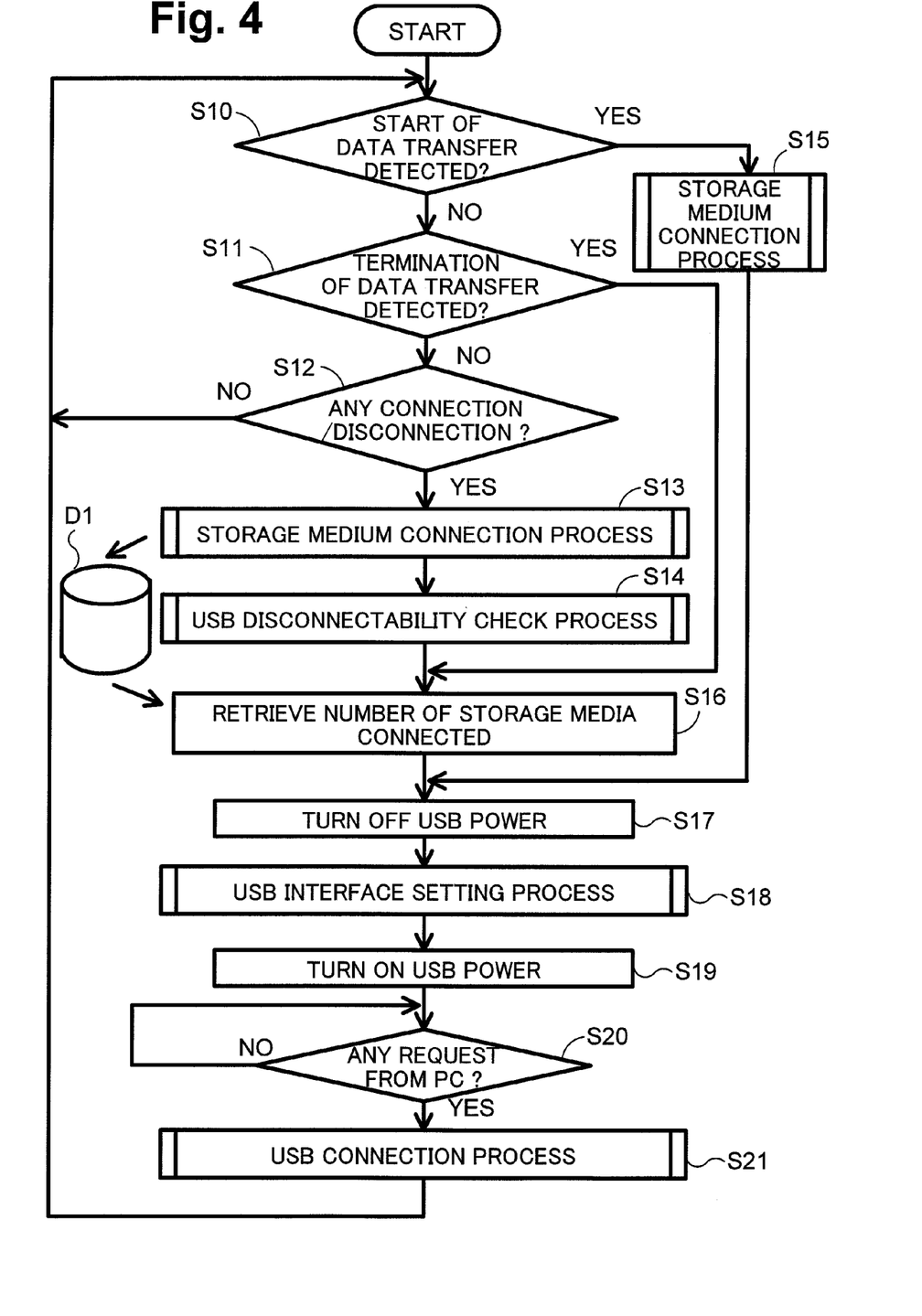
FIG. 4 is a flowchart showing a connection processing in a normal operation state.

FIG. 4 shows a flowchart of the normal-operation connection processing. The processing is executed during normal operation of the peripheral device 1 after the power-on. The processing involves changing the recognition state of storage media which may be connected to the peripheral device 1 in accordance with whether or not a transfer of print data is being performed from the PC 100 to the printer unit 2.

It is determined whether or not the start of print data transfer from the PC 100 is detected (S10). Specifically, it is determined that print data transfer has been started when the reception of print data from the PC 100 is detected. If the start of print data transfer from the PC 100 is detected (S10: YES), the number of storage media connected to the peripheral device 1 is set to "0" irrespective of the actual connection state (S15). If the start of print data transfer from the PC 100 is not detected (S10: NO), it is determined whether or not the termination of print data transfer from the PC 100 is detected (S11). Specifically, it is determined that print data transfer has been terminated when it is detected that print data that was being sent from the PC 100 is no longer being sent. If the termination of print data transfer from the PC 100 is detected (S11: YES), the processing proceeds to step (S16), to be discussed later, in order to retrieve the number-of-storage-media-connected data (D1) from the external storage device 22. If the termination of print data transfer from the PC 100 is not detected (S11: NO), it is determined whether or not a storage medium has been connected/disconnected (S12). That is, it is determined whether or not a storage medium has been mounted into or unmounted from the first slot portion 30 or the second slot portion 31. If no storage medium has been connected/disconnected (S12: NO), the processing returns to step (S10), in order to detect the start of print data transfer from the PC 100. If a storage medium has been connected/disconnected (S12: YES), the processing proceeds to the storage-medium connection processing (shown in FIG. 5) (S13).

In the storage-medium connection processing (shown in FIG. 5), it is determined whether or not a storage medium has been connected (S30). If it is determined that a storage medium has been connected (S30: YES), a storage medium recognition process is performed (S31), and it is determined whether or not the storage medium has been recognized successfully (S32). If the storage medium has been recognized successfully (S32: YES), the processing proceeds to the number-of-storage-media-connected change processing (shown in FIG. 6) (S33). If the storage medium has not been recognized successfully (S32: NO), or if it is determined that a storage medium has not been connected (S30: NO), it is determined whether or not a storage medium has been removed (S34). If it is determined that a storage medium has been removed (S34: YES), a storage medium disconnection process is performed (S35), and the processing proceeds to the number-of-storage-media-connected change processing (shown in FIG. 6) (S36). On the other hand, if it is determined that a storage medium has not been removed (S34: NO), the processing returns to the power-on connection processing (shown in FIG. 3) and the normal-operation connection processing (shown in FIG. 4).

In the number-of-storage-media-connected change processing (shown in FIG. 6), it is determined whether or not a storage medium has been additionally connected (S37). If it is determined that a storage medium has been additionally connected (S37: YES), the number of storage media connected is increased (S38). If it is determined that a storage medium has been removed rather than additionally connected (S37: NO), the number of storage media connected is decreased (S39). After the number of storage media connected is increased or decreased (S38 or S39), all the storage media connected are counted (S40). The obtained number of storage media connected is stored in the external storage device 22 as the number-of-storage-media-connected data (D1) (S41). Thereafter, the processing returns to the storage-medium connection processing (shown in FIG. 5).

The storage-medium connection processing (shown in FIG. 5) and the number-of-storage-media-connected change processing (shown in FIG. 6) thus calculate the number of storage media connected to the peripheral device 1 each time a storage medium is mounted or unmounted.

Returning to the normal-operation connection processing (shown in FIG. 4), after the number of storage media connected is calculated and stored (S13), the processing proceeds to the USB-disconnectability check processing (shown in FIG. 7) (S14).

In the USB-disconnectability check processing (shown in FIG. 7), it is determined, whether or not the printer unit 2 is in operation (S50), whether or the scanner unit 3 is in operation (S51), and whether or not the first and/or second storage media 51 and/or 52 are in operation (S52). If any of them are in operation (S50: YES), (S51: YES) or (S52: YES), the processing repeats the determinations. If none of them are in operation (S50: NO), (S51: NO) and (S52: NO), the processing proceeds to the next step. If none of the printer unit 2, the scanner unit 3 and the first and second storage media 51 and 52 are in operation, it is determined that the USB connection can be disconnected.

Returning to the normal-operation connection processing (shown in FIG. 4), if it is determined in the USB-disconnectability check processing (shown in FIG. 7) that the USB connection can be disconnected (S14), the number-of-storage-media-connected data (D1) stored in the external storage device 22 is loaded into the RAM 23 (S16). Since the USB-disconnectability check processing repeats processes until it is ensured that no data transfer is being performed between the PC 100 and the peripheral device 1 before disconnecting the USB connection, as described above, the USB connection will not be disconnected during data transfer by mistake. Thus, the USB connection can be disconnected safely.

In the following steps, the PC 100 is informed of the number of storage media connected loaded into the RAM 23. First, USB power is turned off (S17). This cuts off the power supply to, and thus electrically turns off, the USB terminal 32. Data transfer with the PC 100 via the USB 60 is thus shut off.

Then, the processing proceeds to the USB-interface setting processing (shown in FIG. 8), in order to register the various functions provided by the peripheral device 1 when interfaced with the PC 100 via the USB and the number of storage media connected to the peripheral device 1 in device configuration information (S18). The term "device configuration information" refers to information for informing the PC 100 of the functions provided by the peripheral device 1. The device configuration information includes information indicating the connection state of storage media to the peripheral device 1 (the number of storage media connected, for example).

In the USB-interface setting processing (shown in FIG. 8), it is sequentially determined whether the functions of the peripheral device 1 include a printer function (S70), a scanner function (S72), and a storage medium connection (S74).

Figure 8:
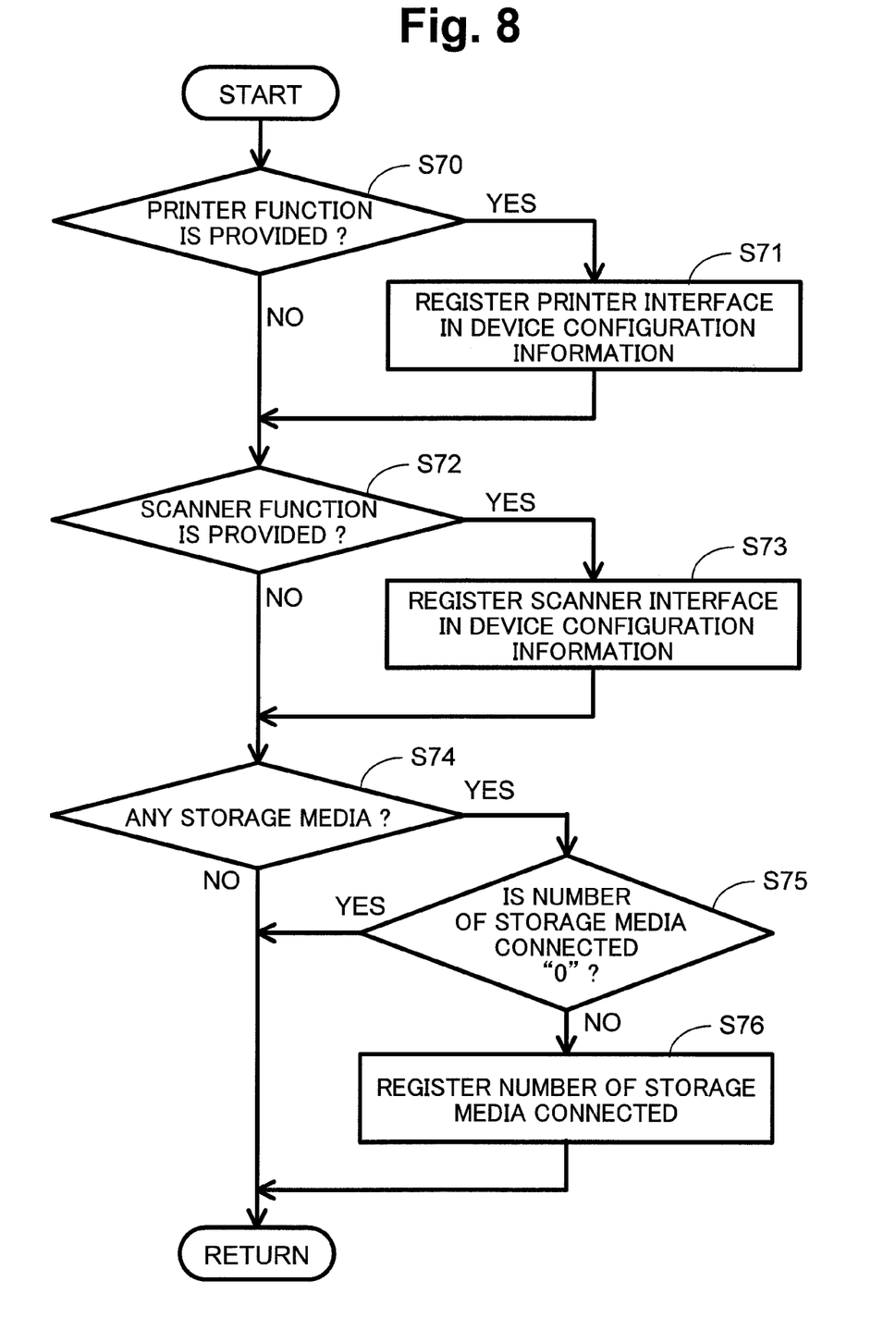
FIG. 8 is a flowchart showing a processing for setting a USB interface.
Figure 9:
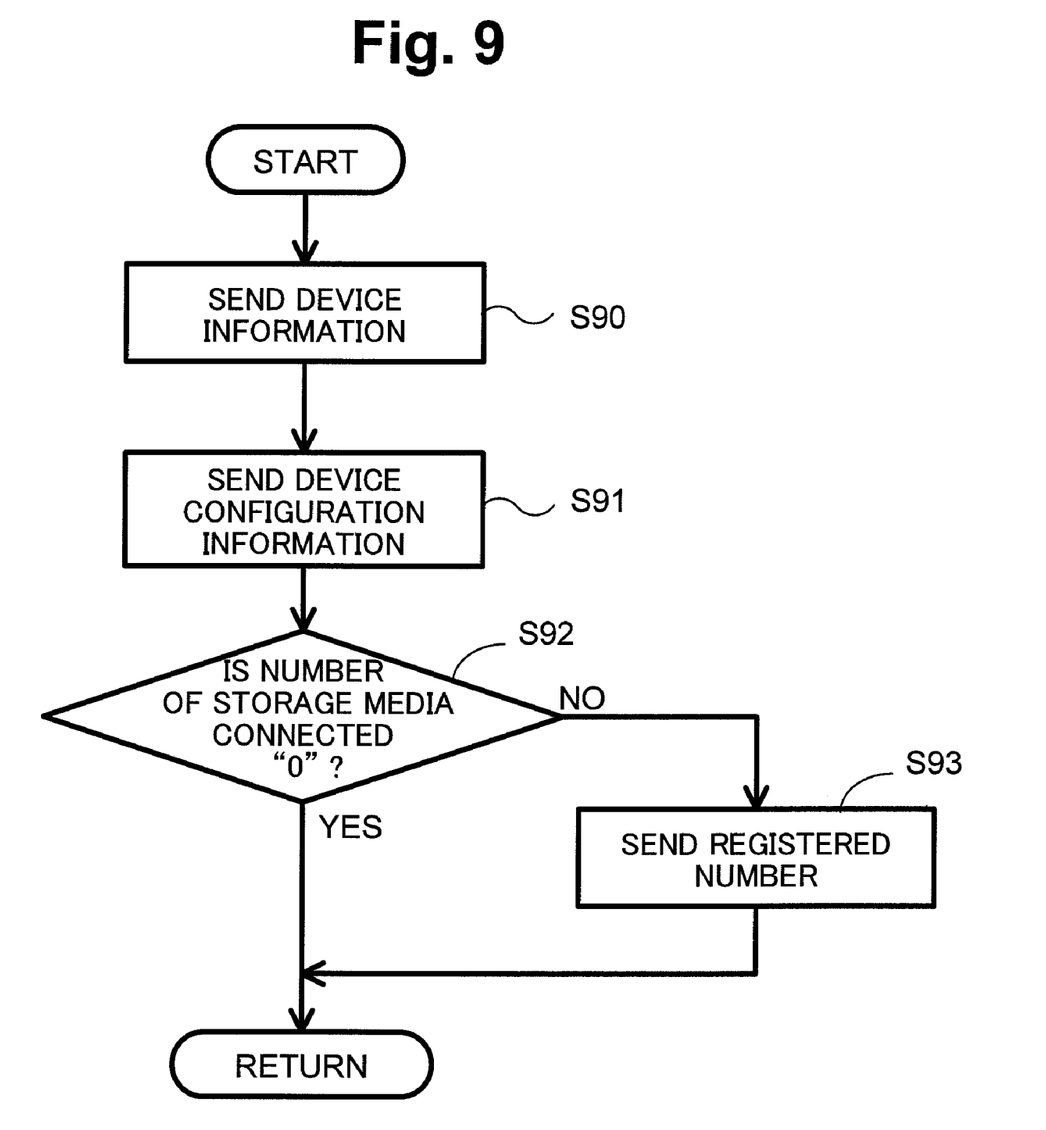
FIG. 9 is a flowchart showing a processing for connecting a USB.

If a printer function is provided (S70: YES), a printer interface is registered in the device configuration information (S71). If a scanner function is provided (S72: YES), a scanner interface is registered in the device configuration information (S73). If a storage medium connection is provided (S74: YES), it is determined whether or not the number of storage media connected is "0" (S75). If the number of storage media connected is not "0" (S75: NO), the number of storage media connected is registered (S76), and the processing returns to the normal-operation connection processing (shown in FIG. 4). If the number of storage media connected is "0" (S75: YES), the processing returns to the normal-operation connection processing (shown in FIG. 4) with the number of storage media connected left unregistered.

After the functions of the peripheral device 1 and the number of storage media connected are registered in the USB-interface setting processing (shown in FIG. 8), or with the number of storage media connected left unregistered in the case where the number of storage media connected is "0" (S18), USB power is turned on to restore the USB terminal 32 into operation (S19). Then, in response to the establishment of a USB connection with the PC 100, it is determined whether or not any requests have been received from the PC 100 for information about the peripheral device (S20). The information about the peripheral device 1 requested by the PC 100 includes the device configuration information. If it is determined that no requests have been received from the PC (S20: NO), the processing repeats the step of S20 until a request is received. If it is determined that a request has been received from the PC (S20: YES), the processing proceeds to the USB connection processing (shown in FIG. 9), in order to send the registered information to the PC 100 (S21).

In the USB connection processing (shown in FIG. 9), first, device information is sent (S90). The device information includes ID information and model information about the peripheral device 1. Then, the device configuration information is sent (S91). The device configuration information includes information about the various functions provided by the peripheral device 1 registered in the USB-interface setting processing (shown in FIG. 8). Then, it is determined whether or not the registered number of storage media is "0" (S92). If the registered number of storage media is not "0" (S92: NO), the registered number is sent (S93). If the registered number of storage media is "0", or if no information about the registered number of storage media is available (S92: YES), no information about the registered number is sent.

When the transmission is finished, the processing returns to the normal-operation connection processing (shown in FIG. 4). In the normal-operation connection processing, the processing returns to step (S10) again, in order to repeat the same steps.

In the normal-operation connection processing, commands from the PC 100 to start and terminate print data transfer are to be detected (S10 and S11). The processing proceeds to step (S12) not only while the PC 100 is sending no print data but also while it is sending print data if a storage medium is mounted or unmounted.

While the PC 100 is sending no print data, the changed number of storage media is sent to the PC 100 as the information about the registered number of storage media through step (S12) and the subsequent steps. While the PC 100 is sending print data, also, the processing proceeds to step (S12). In this case, since the printer unit 2 is in operation, it is not determined in the USB-disconnectability check processing (shown in FIG. 7) that the USB connection can be disconnected. When the print data transfer to the printer unit 2 has completed and the operation of the printer unit 2 has stopped, the processing proceeds to step (S17) and the subsequent steps, in order to send information to the PC 100.

Figure 10:
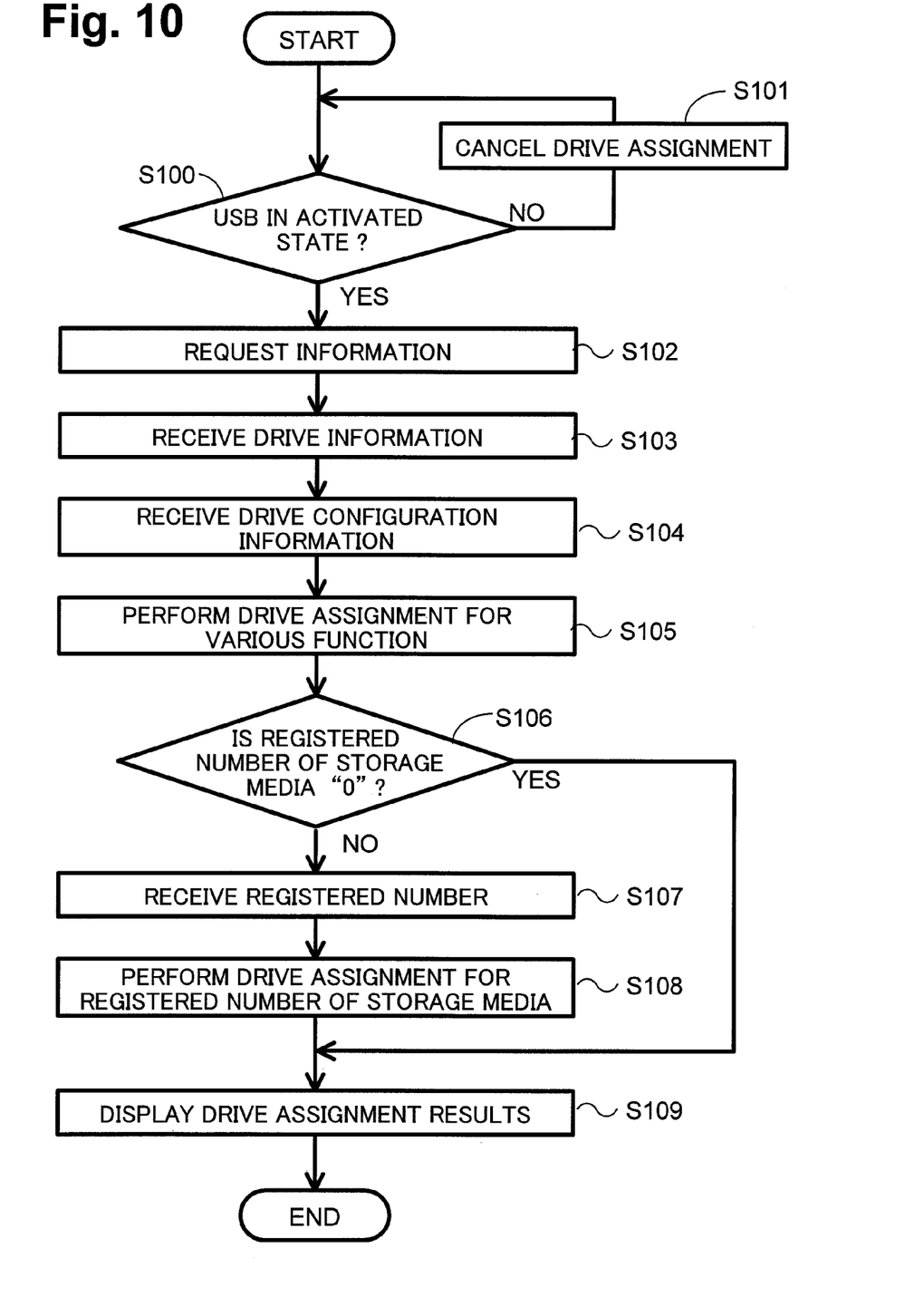
FIG. 10 is a flowchart showing a processing for connecting a USB on a PC side.

The flowchart shown in FIG. 10 illustrates a processing to be executed when a USB connection is established with the peripheral device 1 in order to receive information about the various functions and the registered number of storage media connected sent from the peripheral device 1.

Figure 11:
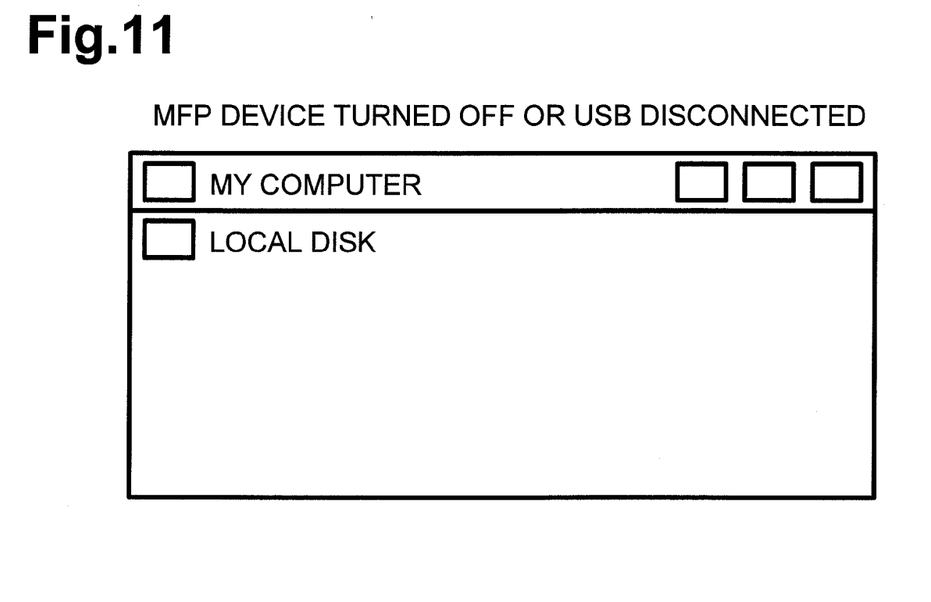
FIG. 11 shows an example of a display screen of a PC 100 (showing a state of drive assignment being canceled)
Figure 12:
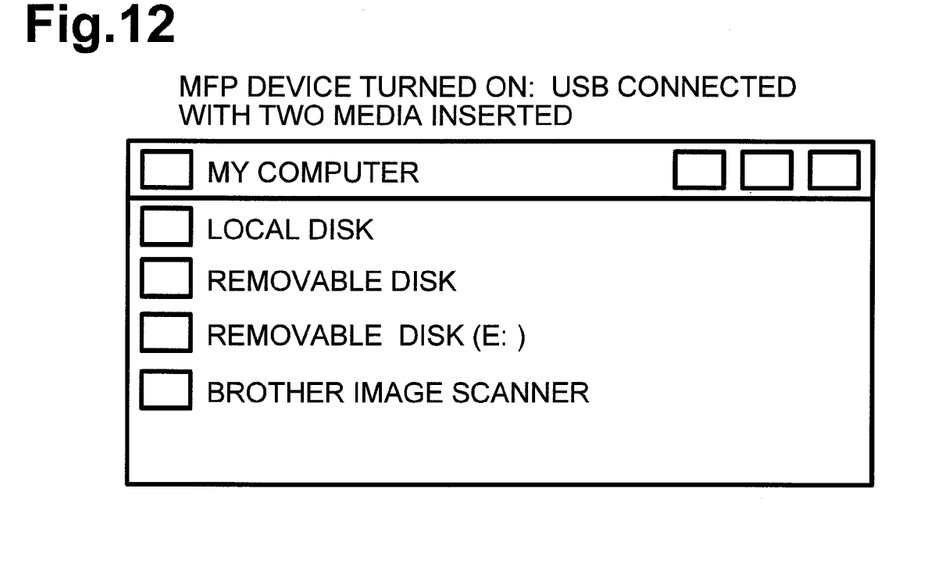
FIG. 12 shows an example of the display screen of the PC 100 (showing a state of drive assignment being performed)

First, it is determined whether or not the USB is in an activated state (S100). The term "activated state" refers to a state in which data transfer can be performed. A power supply to the USB terminal, for example, is one condition of the activated state. If it is determined that the USB is not in the activated state (S100: NO), the PC 100 cancels drive assignment that has been performed for the functions and storage media of the peripheral device (S101). In this case, no devices other than a local drive are shown on the PC 100 display, as shown in FIG. 11. In contrast, FIG. 12 shows a normal state, in which devices such as a Brother image scanner as the peripheral device 1 and removable disks as the first and second storage media 51 and 52 are shown as well as the local drive. When the power supply to the USB terminal 32 is cut off (S17) in the normal-operation connection processing (shown in FIG. 4), the devices are not shown on the PC 100 display. The PC 100 display in this state is shown in the middle part of FIG. 13.

If it is determined that the USB is in the activated state (S100: YES), the processing proceeds to step (S102) and the subsequent processes. The peripheral device 1 is requested to send information about the peripheral device 1 including the device configuration information (S102). The PC 100 waits for the peripheral device 1 to respond to the request, and receives the device information and the device configuration information sent from the peripheral device 1 (S103 and S104). First, the PC 100 performs drive assignment for the various functions such as the printer unit 2, the scanner unit 3, etc., but not for the first and second slot portions 30 and 31 for receiving the first and second storage media 51 and 52, respectively (S105).

Figure 13:
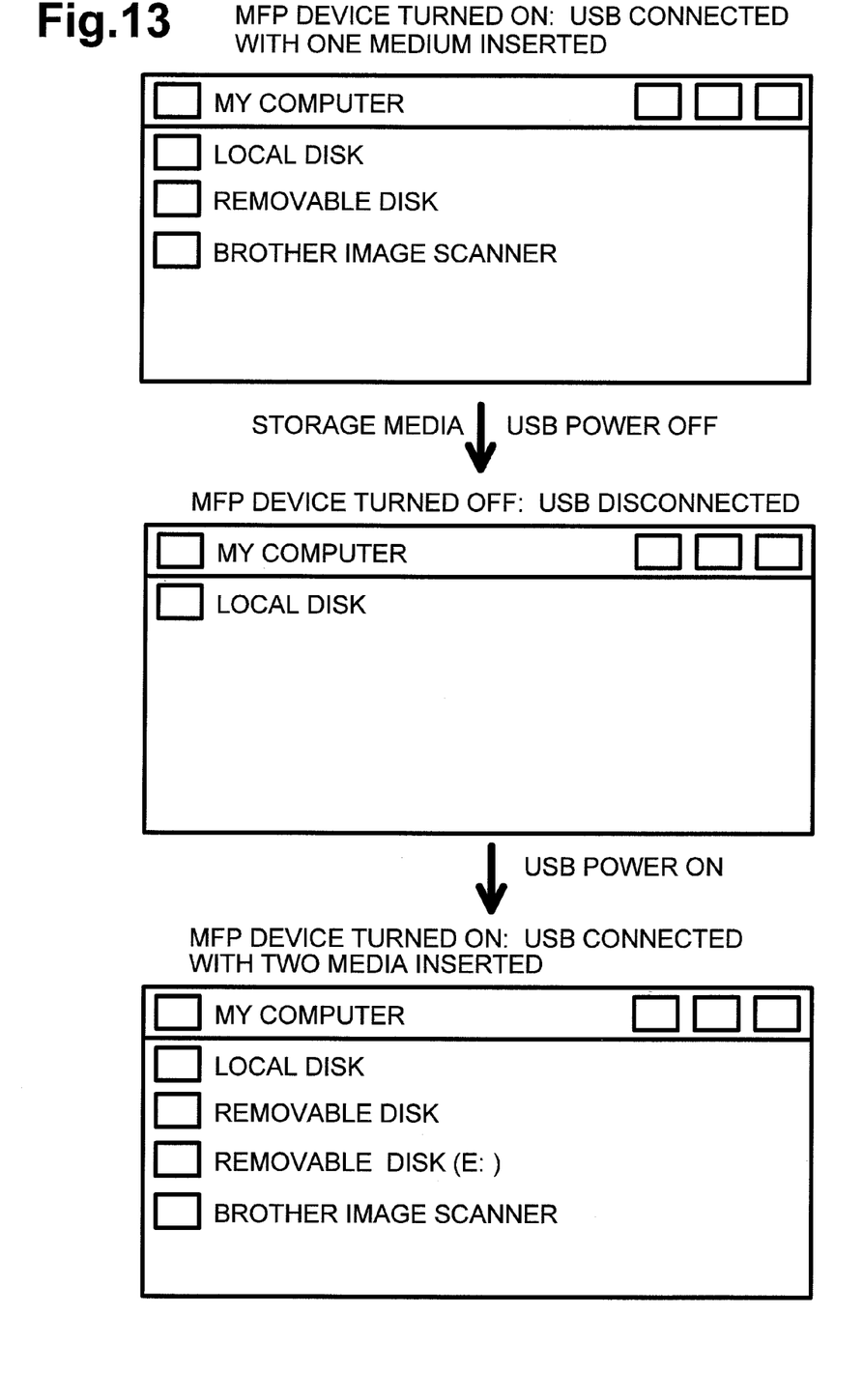
FIG. 13 show an example of the display screen of the PC 100 (at a time of a storage medium being inserted).

Subsequently, it is determined whether or not the registered number of storage media connected to the peripheral device 1 is "0" (S106). If the registered number of storage media is "0", or if no information about the registered number of storage media has been sent, the registered number is determined to be "0" (S106: YES), and only the various functions for which drive assignment has been performed (S105) are shown on the PC 100 display without performing drive assignment for the first and second slot portions 30 and 31 (S109). If the registered number of storage media is not "0" (S106: NO), the PC 100 receives the registered number of storage media sent from the peripheral device 1 (S107), and performs drive assignment for the first and second slot portions 31 and 31, as well, in accordance with the registered number (S108). Along with the various functions for which drive assignment has been performed (S105), one or both of the first and second slot portions 30 and 31 for which drive assignment has been performed are also shown on the PC 100 display (S109). The PC 100 display in this state is shown in the lower part of FIG. 13. In order to change the drive assignment in the PC 100 in response to a change in the registered number of storage media, the drive assignment is temporarily canceled and updated drive assignment results are displayed thereafter, as shown in FIG. 13.

The PC 100 corresponds to an information processing device of the embodiment. The printer unit 2 and the scanner unit 3 correspond to a function execution portion of the embodiment. The first and second storage media 51 and 52 correspond to a storage medium of the embodiment. The first and second slot portions 30 and 31 correspond to a connection portion of the embodiment. Step (S10) to step (S11) in the normal-operation connection processing (shown in FIG. 4) are performed by the CPU 21 on the basis of a command from the PC 100, and correspond to detection step of the embodiment. Step (S10: YES) to step (S15) in the normal-operation connection processing and step (S17) to step (S20) in the normal-operation connection processing are performed by the CPU 21. The processings include turning on and off the power supply to the USB terminal, and correspond to notification step of the embodiment.

The external storage device 22 corresponds to storage unit of the embodiment. A request issuance step of the embodiment corresponds to step (S17) and step (S19) in the normal-operation connection processing.

The peripheral device 1 and the PC 100 connected via the USB 60 correspond to a network system of the embodiment. Step (S105) and step (S108) in the flowchart of FIG. 10 are performed by the PC 100, and correspond to assignment step of the embodiment. Step (109) includes showing information on the PC 100 display, and the PC display corresponds to display unit of the embodiment.

According to the embodiment described in detail above, the state of print data transfer between the printer unit 2 and the PC 100 is detected. When the start of data transfer is detected, setting is made as though none of the first and second storage media 51 and 52 were connected to the first and second slot portions 30 and 31, respectively, irrespective of the actual connection state of the first and second storage media 51 and 52 to the first and second slot portions 30 and 31, respectively. The PC 100 recognizes such setting.

When print data transfer is started between the peripheral device 1 and the printer unit 2, the PC 100 recognizes that none of the storage media 51 and 52 are connected to the peripheral device 1. Therefore, no data transfer with the storage media 51 and 52 occurs, and it may be prevented or reduced that the data transfer with the printer unit 2 from being temporarily interrupted. High-speed processing may be achieved between the printer unit 2 and the PC 100. Consequently, the peripheral device 1 may control the recognition state of the storage media 51 and 52 which may be connected to the peripheral device 1 by the PC 100 during data transfer between the peripheral device 1 and the PC 100 and may restrict access to the storage media 51 and 52 by the PC 100 during the data transfer and thus ensure the data processing speed.

The state of print data transfer between the printer unit 2 and the PC 100 is detected, and when the termination of the data transfer is detected, the connection state of the first and second storage media 51 and 52 is reset. This allows the PC 100 to recognize the actual connection state of the storage media 51 and 52 to the first and second slot portions 31 and 31, respectively.

After the termination of print data transfer with the printer unit 2, setting is made on the basis of the actual connection states of the storage media 51 and 52 to the slot portions 30 and 31, respectively, of the peripheral device 1, allowing the PC 100 to correctly recognize the connection state in order to perform normal data transfer.

Information about the connection state of the storage media 51 and 52 to the slot portions 30 and 31, respectively, is stored in the external storage device 22. Therefore, setting of the connection state can be made by reading the information indicating the connection state from the external storage device 22 in response to, detecting the termination of print data transfer. In this case, the PC 100 may readily grasp the number of storage media connected according to the information indicating the latest connection state.

When the storage media 51 and/or 52 are mounted into or unmounted from the slot portions 30 and/or 31, respectively, and a change in the number of storage media connected is detected, information about the number of storage media connected stored in the external storage device 22 is updated. The information about the number of storage media connected is updated according to the change in the number of storage media connected, allowing the PC 100 to always grasp the correct number of storage media connected.

When the PC 100 requests information about the peripheral device 1 after a USB connection is established, the peripheral device sends the device configuration information to the PC in response to the request. The device configuration information may be utilized by the PC 100 to perform initial setting for the peripheral device 1 when a USB connection is established, as shown in the power-on connection processing (shown in FIG. 3). Through a USB connection, the peripheral device 1 cannot send any information unless requested to do so by the PC 100. Thus, the peripheral device 1 disconnects and reconnects the USB connection to cause the PC to request information. In this way, the peripheral device 1 may cause the PC 100 to recognize with certainty the latest connection state of the storage media 51 and 52 to the slot portions 30 and 31, respectively.

According to the network system of the embodiment, the PC 100 is caused via the USB 60 to recognize the connection state of the storage media 51 and 52 set by the peripheral device 1. The PC 100 performs drive assignment for the slot portions 30 and 31 to which a storage medium is connected, making the slot portions 30 and 31 accessible. The drive assignment results are displayed on the PC 100. Thus, if the peripheral device 1 makes setting as though the storage media 51 and 52 were not connected to the slot portions 30 and 31, respectively, irrespective of the actual connection state, the PC 100 will not perform drive assignment for the slot portions 30 and 31. During print data transfer between the PC 100 and the printer unit 2, drive assignment is not performed to the slot portions 30 and 31, making the storage media 51 and 52 inaccessible. The print data transfer between the printer unit 2 and the PC 100 thus is not interrupted, allowing high-speed processing.

Although the printer unit 2 of the peripheral device 1 is used as an example of the function execution portion in the embodiment, the embodiment may be applied to data transfer between the PC 100 and the scanner unit 3 or the FAX unit in place of the printer unit 2.

Although the USB-interface setting processing (shown in FIG. 8) of the embodiment checks at each processing all the functions of and the number of storage media connected to the peripheral device 1, the number of storage media connected to and, even, the various functions of the peripheral device may be checked and reregistered only if changed since the last processing.

Although a Compact Flash (registered trademark) and an SD Memory Card (registered trademark) are mentioned as examples of the first and second storage media 51 and 52 in the embodiment, it is a matter of course that any storage medium or device that is removably mountable via a special-purpose or general-purpose slot may be used, such as other flash memory cards, USB flash drives, digital cameras and cellular phones.

What is claimed is:

1. A peripheral device comprising:
   a connection portion which is connectable to an information processing device and a storage medium, the connection portion being configured to allow data transfer with the storage medium and to allow data transfer with the information processing device;
   a function execution portion that performs data transfer with the information processing device and performs a function according to data transferred from the information processing device;
   a detection portion that detects a state of the data transfer between the function execution portion and the information processing device; and
   a notification portion that notifies the information processing device that the storage medium is not connected to the connection portion, irrespective of whether the connection state of the storage medium to the connection portion is connected or not, when the detection portion detects a start of the data transfer between the function execution portion and the information processing device.

2. The peripheral device according to claim 1, wherein the notification portion further notifies the information processing device of the real connection state of the storage medium to the connection portion when the detection portion detects a termination of the data transfer between the function execution portion and the information processing device.

3. The peripheral device according to claim 1, wherein when the detection portion detects a change of the connection state of the storage medium to the connection portion while no data transfer is being performed, the notification portion further notifies the information processing device of the changed connection state.

4. The peripheral device according to claim 1, further comprises a storage unit that stores a number of storage media connected to the connection portion, wherein the notification portion notifies the information processing device of the stored number of storage media connected to the connection portion as the connection state.

5. The peripheral device according to claim 4, wherein the notification portion notifies the information processing device that the number of storage media connected to the connection portion is zero when the detection portion detects the start of data transfer between the function execution portion and the information processing device.

6. The peripheral device according to claim 1, wherein the notification portion notifies the information processing device of the connection state in response to receiving a request from the information processing device, and the notification portion sends an instruction to cause the information processing device to issue the request, when the detection portion detects the start of the data transfer between the function execution portion and the information processing device.

7. The peripheral device according to claim 6, the connection portion comprises an interface that allows a communication by using universal serial bus protocol.

8. The peripheral device according to claim 7, wherein the notifying portion executes turning off and on a power of the interface as the instruction to cause the information processing device to issue the request.

9. A network system comprising a peripheral device and an information processing device, the peripheral device including:
   a connection portion which is connectable to the information processing device and a storage medium, the connection portion being configured to allow data transfer with the storage medium and to allow data transfer with the information processing device;
   a function execution portion that performs data transfer with the information processing device and performs a function according to data transferred from the information processing device;
   a detection portion that detects a state of the data transfer between the function execution portion and the information processing device; and
   a notification portion that notifies the information processing device that the storage medium is not connected to the connection portion, irrespective of whether the connection state of the storage medium to the connection portion is connected or not, when the detection portion detects a start of the data transfer between the function execution portion and the information processing device, and the information processing device including:
      an assignment portion for assigning a drive to the connection portion according to the connection state of the storage medium to the connection portion notified by the notification portion; and
      a display unit for displaying the drive assigned by the assignment portion.

* * * * *